June 16, 1925.
W. B. RENSHAW
CAR DOOR CONTROL DEVICE
Filed Nov. 20, 1924
1,542,004
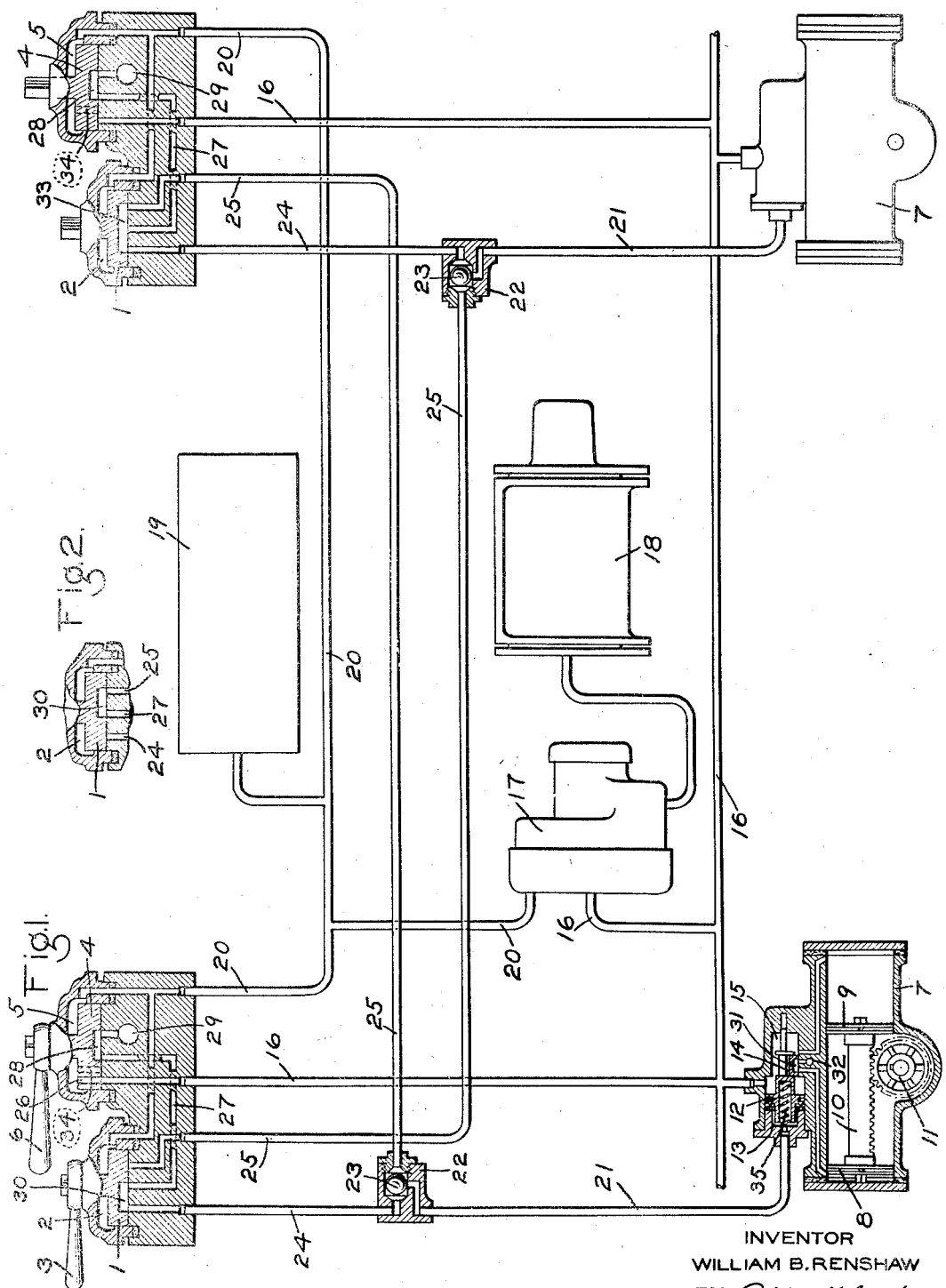
INVENTOR
WILLIAM B. RENSHAW
BY
ATTORNEY Patented June 16, 1925.

1,542,004

UNITED STATES PATENT OFFICE.

WILLIAM B. RENSHAW, OF WILMERDING, PENNSYLVANIA, ASSIGNOR TO THE WESTINGHOUSE AIR BRAKE COMPANY, OF WILMERDING, PENNSYLVANIA, A CORPORATION OF PENNSYLVANIA.

CAR-DOOR-CONTROL DEVICE.

Application filed November 20, 1924. Serial No. 750,989.

*To all whom it may concern:*

Be it known that I, WILLIAM B. RENSHAW, a citizen of the United States, residing at Wilmerding, in the county of Allegheny and State of Pennsylvania, have invented new and useful Improvements in Car-Door-Control Devices, of which the following is a specification.

This invention relates to car door controlling devices, and more particularly on cars employed in electric traction service.

The principal object of my invention is to provide an improved car door controlling apparatus, in which the doors may be operated at either end of the car, either together or separately.

In the accompanying drawing; Fig. 1 is a diagrammatic view of a car door controlling apparatus embodying my invention; and Fig. 2 a section of the door selector valve device in one of its operating positions.

As shown in the drawing, the equipment may comprise a brake and door controlling valve mechanism at each end of the car and having a door selector valve portion including a rotary valve 1, contained in valve chamber 2, and adapted to be operated by handle 3. The brake and door controlling portion may include a rotary valve 4, contained in valve chamber 5, and adapted to be operated by handle 6.

One or more door controlling engines may be provided for controlling the car doors at each end of the car and each door engine may comprise a casing 7 having a piston chamber containing pistons 8 and 9 which are connected together by a rack bar 10, the teeth of which engage a gear 11, the rotation of the gear 11 being adapted to effect the opening and closing of a car door.

For controlling the fluid pressure for actuating the pistons 8 and 9, a valve device is provided comprising a piston 12, contained in piston chamber 13, and a slide valve 14, contained in valve chamber 15, and adapted to be operated by piston 12. The valve chamber 15 is connected to the emergency brake pipe 16 of the usual emergency brake equipment, which includes an emergency valve device 17 operable upon a reduction in pressure in the emergency brake pipe 16 for supplying fluid under pressure to a brake cylinder 18, so as to effect an emergency application of the brakes.

The main reservoir 19 or other source of fluid under pressure is connected to a main reservoir pipe 20, from which fluid under pressure is supplied to the rotary valve chambers 2 and 5 of the brake and door controlling valve devices and to the emergency valve device 17.

A pipe 21 leads from piston chamber 13 of the door engine controlling valve device to a double check valve device 22, containing a ball check valve 23, and pipes 24 and 25 lead from said check valve device to the seats of the rotary valves 1 at opposite ends of the car.

In operation, assuming that the car is being operated by the controlling valves at the left of the drawing, with the brake and door controlling valve 4 in release and door closing position, as shown, fluid is supplied from rotary valve chamber 5, through port 26 to the emergency brake pipe 16, and passage 27 leading to the seat of the rotary valve 1 is connected through cavity 28 with exhaust port 29. If it is desired to operate only the car door at the operating end of the car, the selector valve 1 is placed in the position shown at the left of the drawing, in which a cavity 30 connects pipe 24 with passage 27.

Piston chamber 13 of the door engine is thus connected to the exhaust port 29 and emergency brake pipe pressure in valve chamber 15 maintains piston 12 in its left hand position, so that slide valve 14 opens communication through which fluid from the brake pipe is supplied to piston 9, while piston 8 is connected through cavity 31 with exhaust port 32. The pistons 8 and 9 are therefore maintained in the left hand position, as shown in the drawing, in which position the car door is held closed.

At the non-operating end, the rotary valves 1 and 4 are left in handle off position, as shown, in which rotary valve 4 connects passage 27 with exhaust port 29 and a cavity 33 in rotary valve 1 connects pipes 24 and 25 with passage 27. The piston chamber 13 of the door engine at the non-operating end of the car is thus connected to the atmosphere, so that the door engine is held in its door closing position.

If the operator desires to open the car door at the operating end of the car, the rotary valve 4 is moved to a position, in which a port 34 registers with passage 27. Fluid under pressure is then supplied through cavity 30 to pipe 24 and shifts the check valve 23 so as to cut off communication to pipe 25 while opening communication from pipe 24 to pipe 21. Fluid under pressure is then admitted to piston chamber 13 and with the aid of spring 35 causes the piston 12 to be shifted to the right. In the right hand position, the piston 9 is connected to exhaust port 32, while piston 8 is supplied with fluid under pressure from valve chamber 15. The pistons 8 and 9 are thereupon shifted to the right and the door controlled by the door engine is opened.

If it is desired to operate only the car door at the non-operating end, the valve 1 is placed in the position shown in Fig. 2, in which cavity 30 connects passage 27 with pipe 25. It will now be evident that when the rotary valve 4 is operated to open the car door, fluid will be supplied to pipe 25 instead of pipe 24 and will flow to the check valve 23 at the non-operating end. Said check valve is then shifted, so as to cut off communication to pipe 24 and at the same time open communication to pipe 21. Fluid under pressure is thus supplied to piston 12 of the door engine at the non-operating end of the car and said door engine is thereupon operated to open the corresponding car door.

If the operator desires to operate the car doors at both ends of the car, the rotary valve 1 is placed in a position in which a cavity in the valve connects both pipes 24 and 25 with passage 27, so that when the brake valve handle 6 is operated to open the car doors, both door engines will be operated, as will be evident, to effect the opening of the car doors.

The check valve 23 prevents loss of fluid at the non-operating end of the car, when the door at the operating end is being operated and also when the door at the non-operating end is being operated.

If the emergency brake pipe pressure is reduced, the fluid pressure acting on the piston 9 of each door engine is likewise exhausted, so that atmospheric pressure acts on opposite sides of the pistons 8 and 9, permitting the car doors to be opened manually, if desired.

Having now described my invention, what I claim as new and desire to secure by Letters Patent, is:

1. In a car door control apparatus, the combination with a door engine, of a door controlling valve device at each end of the car, a door control pipe leading from each door controlling valve device to the door engine, and a double check valve for controlling communication from said control pipes to the door engine.

2. In a car door control apparatus, the combination with a door engine, of a door controlling valve device at each end of the car, a door control pipe leading from each door controlling valve device to the door engine, and a double check valve operated by the pressure of fluid supplied from one controlling valve device through its control pipe for opening communication from said control pipe to the door engine and for closing communication from said control pipe and the door engine to the other control pipe.

3. In a car door control apparatus, the combination with two door engines, of a door controlling valve device at each end of the car, a door control pipe leading from each controlling valve to each door engine, and a double check valve for controlling communication from each control pipe to one of said door engines.

In testimony whereof I have hereunto set my hand.

WILLIAM B. RENSHAW.